United States Patent
Yoshida et al.

(10) Patent No.: US 11,192,256 B2
(45) Date of Patent: Dec. 7, 2021

(54) METHOD OF ASSEMBLING OR DISASSEMBLING HOUSING SHELF, METHOD OF PRODUCING CERAMIC FIRED BODY, AND TRANSFERRING SYSTEM

(71) Applicant: NGK INSULATORS, LTD., Nagoya (JP)

(72) Inventors: Shinya Yoshida, Nagoya (JP); Yuito Abe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 191 days.

(21) Appl. No.: 16/265,144

(22) Filed: Feb. 1, 2019

(65) Prior Publication Data

US 2019/0255711 A1  Aug. 22, 2019

(30) Foreign Application Priority Data

Feb. 19, 2018 (JP) .............................. JP2018-027223

(51) Int. Cl.
| | |
|---|---|
| *H04N 5/225* | (2006.01) |
| *B25J 9/16* | (2006.01) |
| *G03B 15/05* | (2021.01) |
| *G06T 7/13* | (2017.01) |

(52) U.S. Cl.
CPC ............ *B25J 9/1697* (2013.01); *G03B 15/05* (2013.01); *G06T 7/13* (2017.01); *H04N 5/2253* (2013.01); *H04N 5/2256* (2013.01); *G03B 2215/0514* (2013.01)

(58) Field of Classification Search
CPC .................. B25J 9/1697; G03B 15/05; G03B 2215/0514; G03B 15/02; H04N 5/2256; H04N 5/2253; G06T 7/13; G05B 2219/45064; F27D 3/0021; F27D 5/0006; F27D 21/02; F27D 2021/026; F27M 2001/1504; F27M 2003/04; B65G 47/904; C04B 35/10; C04B 35/18; C04B 35/622; C04B 35/64

See application file for complete search history.

(56) References Cited

U.S. PATENT DOCUMENTS

| | | | |
|---|---|---|---|
| 2018/0253516 A1* | 9/2018 | Shimano | G06F 30/20 |
| 2020/0084382 A1* | 3/2020 | Furukawa | H04N 5/2253 |
| 2020/0238519 A1* | 7/2020 | Diankov | B25J 9/1664 |
| 2020/0298404 A1* | 9/2020 | Theobald | B25J 9/041 |

FOREIGN PATENT DOCUMENTS

| | | |
|---|---|---|
| EP | 2 233 871 B1 | 1/2012 |
| JP | 4768044 B2 | 9/2011 |

* cited by examiner

*Primary Examiner* — Rick K Chang
(74) *Attorney, Agent, or Firm* — Burr & Brown, PLLC

(57) ABSTRACT

A method of assembling or disassembling a housing shelf configured at least from shelf plates and frames, including a step in which a chuck holds a frame; a step of determining, based on an image captured by an imager that captures an image of the frame held by the chuck and positioned at an imaged position, a position of a target portion of the frame on the image; and a step of determining, based on the determined position on the image, at least one correction value for causing a change in a release position for the frame when the frame is released from the chuck onto the shelf plate. The target portion may be an inner wall surface of the frame. An illumination unit may be arranged between the imager and the imaged position of the frame.

20 Claims, 13 Drawing Sheets

METHOD OF ASSEMBLING OR DISASSEMBLING HOUSING SHELF, METHOD OF PRODUCING CERAMIC FIRED BODY, AND TRANSFERRING SYSTEM

CROSS-REFERENCE TO RELATED APPLICATION

The present application claims priority from Japanese Patent Application No. 2018-27223, filed Feb. 19, 2018, entitled "Method of assembling or disassembling housing shelf, Method of producing ceramic fired body, and Transferring system", the entirety of which is incorporated herein by reference.

FIELD OF THE INVENTION

The present disclosure is related to a method of assembling or disassembling a housing shelf, a method of producing a ceramic fired body, and a transferring system.

BACKGROUND OF THE INVENTION

Japanese Patent No. 4768044 discloses in its FIG. 2 a combination of lid plates and frame members used for firing.

SUMMARY OF THE INVENTION

Accuracy of position where a frame is released from a chuck may possibly be degraded due to accumulated deformation of the frame that has repeatedly passed through a firing kiln.

A method according to an aspect of the present disclosure may be a method of assembling or disassembling a housing shelf configured at least from shelf plates and frames. The method may include:

a step in which a chuck holds a frame;

a step of determining, based on an image captured by an imager that captures an image of the frame held by the chuck and positioned at an imaged position, a position of a target portion of the frame on the image; and a step of determining, based on the determined position on the image, at least one correction value for causing a change in a release position for the frame when the frame is released from the chuck onto the shelf plate, wherein the target portion is an inner wall surface of the frame, an illumination unit is arranged between the imager and the imaged position of the frame, and a shadow of the frame formed by an illumination light emitted from the illumination unit is positioned outward of the inner wall surface of the frame so as not to be captured by the imager.

In some cases, a first angle between a light ray and an axial line may be greater than a second angle between an optical path and the axial line, said light ray being emitted from the illumination unit and passing nearby and inward of the target portion of the frame, and said optical path being directed from the target portion of the frame to an optical system of the imager. The axial line may be parallel to the inner wall surface of the frame.

In some cases, the illumination unit may include one or more light sources, and a base to which the one or more light sources are secured.

In some cases, the base may be captured in the image.

In some cases, the chuck may be provided with a reflective plate for reflecting a light that has been emitted from the illumination unit and transmitted through the inside of the frame.

In some cases, the illumination unit may emit a light ray that passes nearby and inward of an inner edge of the frame positioned at the reflective plate side.

In some cases, a reflective face of the reflective plate may include a reflecting section and a shadow section where the shadow of the frame is projected, and a boundary between the reflecting section and the shadow section may be positioned outward of the inner wall surface of the frame.

In some cases, the inner wall surface of the frame may include first and second sides, the first side being closer to the imager than the second side, and the second side being equal to the target portion.

In some cases, said step of determining, based on an image captured by an imager that captures an image of the frame held by the chuck and positioned at an imaged position, a position of a target portion of the frame on the image may be performed based on an edge detection processing.

In some cases, displacement of the chuck in accordance with the correction value may cause displacement of the frame in a horizontal direction perpendicular to a vertical direction when the frame is released from the chuck.

In some cases, displacement of the chuck in accordance with the correction value may cause rotation of the frame around a vertical direction when the frame is released from the chuck.

In some cases, the method may further include:

a step in which the chuck releases the frame over or onto the shelf plate;

a step in which the chuck holds the shelf plate to be placed on a frame, positions the shelf plate over the frame, and releases the shelf plate onto the frame.

In some cases, the frame may include alumina ($Al_2O_3$) or mullite ($3Al_2O_3.2SiO_2$).

In some cases, the frame may be shaped like a polygon.

In some cases, the shelf plate may be provided with at least one protrusion so as to restrict the position of the frame on the shelf plate.

In some cases, a ceramic body may be placed on the shelf plate, and the ceramic body may include at least silicon carbide (SiC).

In some cases, a ceramic body may be placed on the shelf plate, and the ceramic body may have a lattice-like cell-wall that defines a plurality of cells.

A method of producing a ceramic fired body according to an aspect of the present disclosure may include:

a step in which a housing shelf passes through a firing kiln, said housing shelf being assembled by a method described at any one of above paragraphs; and a step of taking out a ceramic fired body from the housing shelf which has passed through the firing kiln.

A transferring system according to an aspect of the present disclosure may be a transferring system for transferring a frame included in a housing shelf that is configured from at least shelf plates and frames, the system comprising:

a chuck that holds a frame;

an imager that captures an image of a frame held by the chuck and positioned at an imaged position; and a correction value determining unit, said correction value determining unit determining, based on an image captured by the imager, a position of a target portion of the frame on the image, and said correction value determining unit determining, based on the determined position on the image, at least one correction value for causing a change in a release position for the frame when the frame is released onto the shelf plate, wherein the target portion is an inner wall surface of the frame, an illumination unit is arranged between the imager and the imaged position of the frame, and a shadow of the frame formed by an illumination light emitted from the illumination unit is positioned outward of the inner wall surface of the frame so as not to be captured by the imager.

According to an aspect of the present disclosure, accuracy of release position of a frame released from a chuck may be improved.

BRIEF DESCRIPTION OF THE DRAWINGS

Hereinafter, non-limiting embodiments of the present disclosure will be described with reference to FIGS. 1 to 15 in which like numerals represent like elements. A skilled person would be capable of combining respective embodiments and/or respective features without a need of excess descriptions, and would appreciate synergistic effects of such combinations. Overlapping descriptions among the embodiments would be basically omitted. Referenced drawings are prepared for the purpose of illustration of invention, and may possibly be simplified for the sake of convenience of illustration. Individual features identified by an expression of "in some cases" would be understood as a universal feature that is effective not only to a transferring system and/or a method using the same disclosed in the present application but also effective to various transferring systems and/or methods using the same not particularly disclosed in the present application.

DETAILED DESCRIPTION OF THE INVENTION

Figure 1:
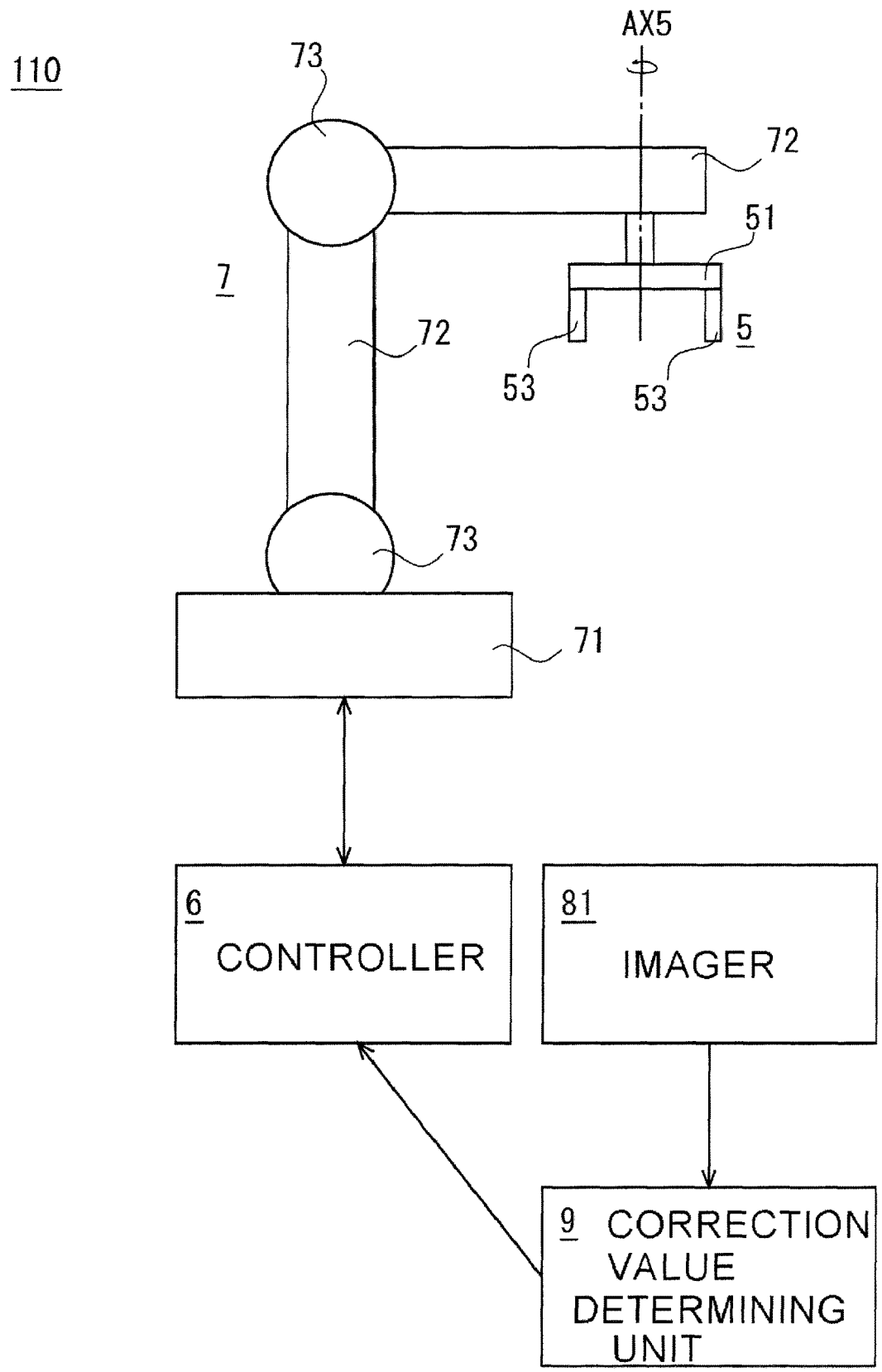
FIG. 1 is a schematic view of a transferring system according to an aspect of the present disclosure.

FIG. 1 is a schematic view of a transferring system 110. The transferring system 110 includes a chuck 5 that holds a frame 2 (See FIG. 2 or FIG. 10), a controller 6 that generates an command instruction for displacement of at least the chuck 5, a robot arm 7 that operates based on commands from the controller 6, an imager 81 that captures an image of a frame 2 held by the chuck 5 and positioned at an imaged position, and a correction value determining unit 9. The correction value determining unit 9 determines, based on an image captured by the imager 81, a position of a target portion of the frame 2 on the image and determines, based on the determined position on the image, at least one correction value for causing a change in a release position of a frame 2 when the frame 2 is released onto a shelf plate 1.

Figure 10:
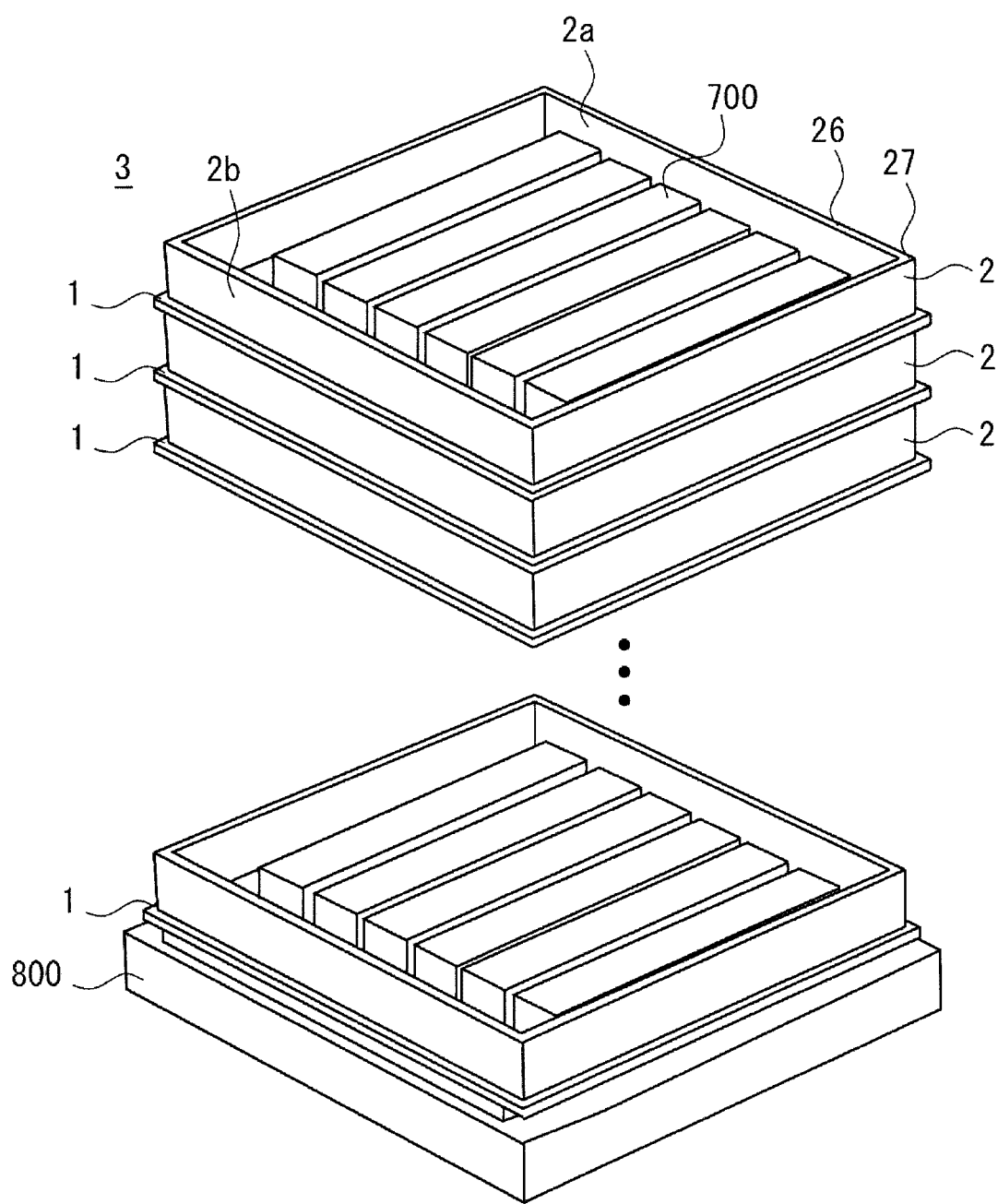
FIG. 10 is a schematic perspective view showing an example of a housing shelf that has been newly assembled.

When included in a housing shelf 3, the frame 2 has a peripheral wall 26 that extends in a circumferential direction about or centered around an axial line parallel to a vertical direction (See FIG. 10). The peripheral wall 26 is continuous or discontinuous in the circumferential direction. In a case where the peripheral wall 26 is continuous in the circumferential direction, the frame 2 is a closed frame. In a case where the peripheral wall 26 is discontinuous in the circumferential direction, the frame 2 is an open frame. In some cases, the frame 2 is shaped like a polygon and/or the peripheral wall 26 defines a polygon opening. A cross-sectional shape of the frame 2 in a plane perpendicular to a vertical direction may be a rectangle. The peripheral wall 26 may be provided with a plurality of corners 27. When the frame 2 is rectangle-shaped, the peripheral wall 26 is provided with four corners 27.

The chuck 5 may hold a frame 2 in various manners such as grasping, sucking or magnetically attracting. When the chuck 5 holds the frame 2, the chuck 5 may physically touch the frame 2*b*, but not necessarily limited to this. In some cases, the chuck 5 includes one or more pairs of contact portions 53 where an interval is adjustable. By decreasing the interval between the contact portions 53 of the pair, the frame 2 would be sandwiched between the contact portions 53 by increasing the interval between the contact portions 53 of the pair, the frame 2 would be released from the contact portions 53. The contact portion 53 may touch the outer wall surface 2b of the frame 2b, but should not be limited to this. In a case where the contact portion 53 touches the inner wall surface 2a of the frame 2, if the interval between the contact portions 53 of the pair is increased, then the frame 2 would be held by the contact portions 53. If the interval between the contact portions 53 of the pair is decreased, then the frame 2 would be released from the contact portions 53. The chuck 5 may be configured to be rotatable about an axial line AX5 as a rotational axis, the benefit of which would be described below.

The chuck 5 has a main body 51 that is attached to an arm terminal of a robot arm 7. Relative displacement of the contact portion 53 relative to the main body 51 would be variously achieved such as expansion/contraction of a cylinder, displacement of a nut of a ball screw, displacement of a slider on a linear guide. In some cases including FIG. 2, the contact portion 53 is attached to an arm 52 that is coupled to the main body 51 via a cylinder 54. In accordance with expansion/contraction of the cylinder 54, the contact portion 53 is displaced relative to the main body 51.

In some cases, the contact portion 53 may be configured to reduce an impact which may be applied to a frame 2 when a frame 2 is grasped by the chuck 5. The contact portion 53 may include a shock absorbing material such as a cushion or a rubber sheet. The cushion or rubber sheet may touch the inner wall surface 2a and/or the outer wall surface 2b of the frame 2.

The robot arm 7, optionally included in the transferring system 110, may include at least one base 71, two or more links 72, and one or more joints 73 for coupling adjacent links 72. The link 72 can pivot relative to the base 71. Relative to one link 72, another link 72 can pivot. The base may be provided rotatably. The robot arm 7 is capable of moving the chuck 5 between a pick location and a release location that is different from the pick location. The pick location is a location where the chuck 5 holds the shelf plate 1 or the frame 2, and the release location is a location where the chuck 5 releases the shelf plate 1 or the frame 2. The robot arm 7 may include a plurality of motors and driver circuits for controlling the respective motors.

Figure 2:
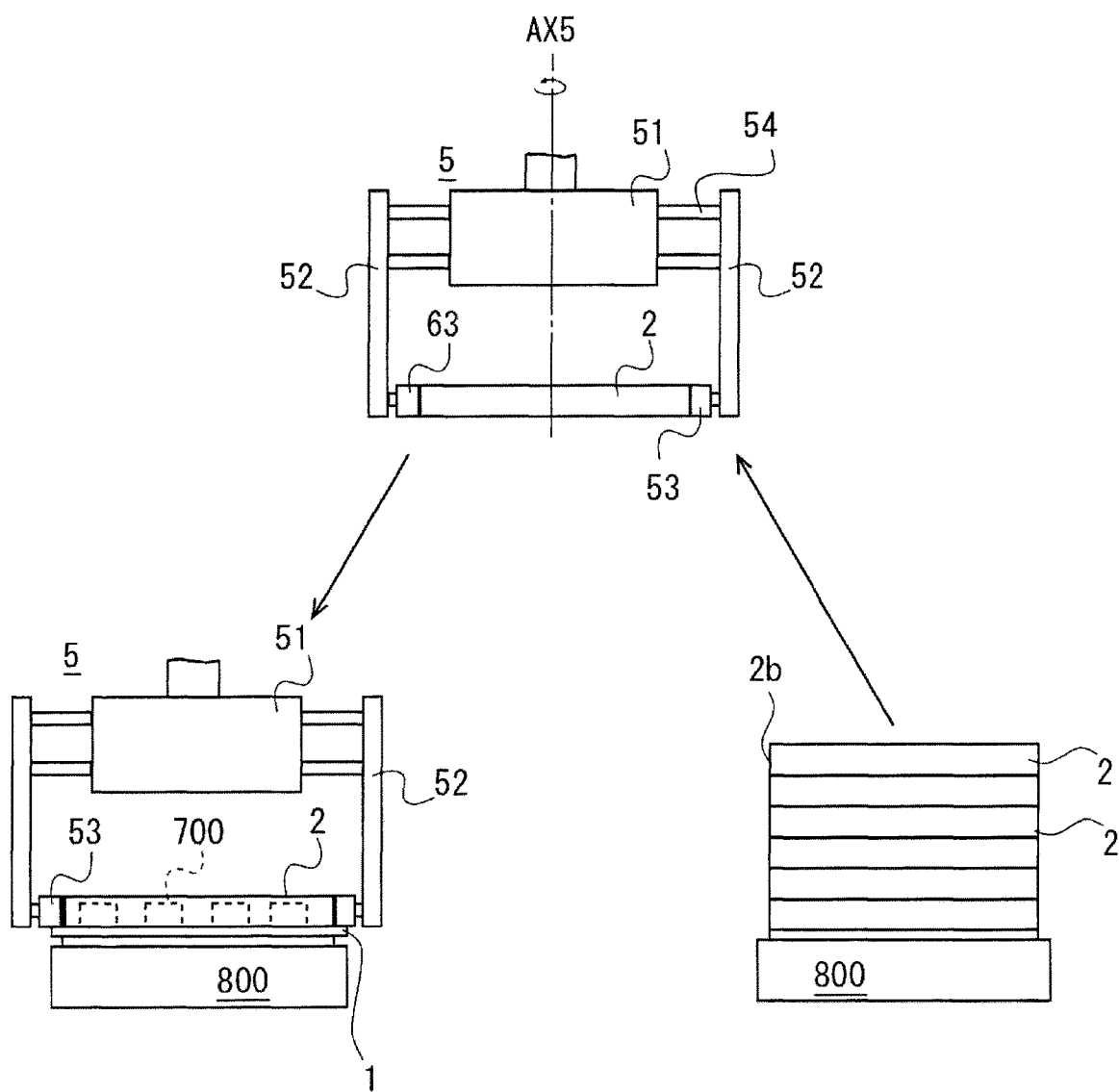
FIG. 2 is a schematic view illustrating that a frame is transferred by a chuck of a transferring system according to an aspect of the present disclosure.

Referring to FIG. 2, the chuck 5 holds a frame 2 at the uppermost layer in a stack of frames 2 placed or supplied to a pick location. In accordance with actuation of the robot arm 7, the chuck 5 and the frame 2 held by the chuck 5 are moved along the horizontal direction perpendicular to the vertical direction. At a release location, the chuck 5 releases the frame 2, and the frame 2 is placed on the shelf plate 1. In some cases, the chuck 5 operates to alternately stack the shelf plate 1 and the frame 2. Accordingly, a housing shelf 3 such as shown in FIG. 2 or FIG. 10 would be assembled. An embodiment is envisaged where, when a housing shelf 3 is assembled, a worker (i.e. human) or other device places each shelf plate 1 onto each frame 2. An embodiment is envisaged where a worker or other device places at least one frame 2 to be included in a housing shelf 3 onto a shelf plate 1. In a case where a housing shelf 3 has a base 800, the lowermost shelf plate 1 or the frame 2 is placed onto the base 800. When a frame 2 is placed onto a shelf plate 1, one or more ceramic bodies may be placed onto a shelf plate 1, but not necessarily limited to this.

The transferring system 110 includes a controller 6 that generates a command instruction for displacement of the chuck 5. In some cases, the controller 6 may be a controller for the robot arm 7. The chuck 5 is displaced based on control of the robot arm 7, determining a position of the chuck 5. Additionally, the controller 6 may also serve as a controller of the chuck 5, switching the state of the chuck 5 between a holding state at which the chuck 5 holds a frame 2 and a releasing state at which the chuck 5 releases a frame 2. A case is envisaged where mechanism other than the robot arm 7 is employed for displacing the chuck 5. That is, it is also envisaged that the chuck 5 is attached to another different mechanism.

The controller 6 outputs a command directly or indirectly to respective motors included in the robot arm 7, causing a continuous motion of the chuck 5. Additionally, the controller 6 may output a command directly or indirectly to a cylinder of the chuck 5 at an appropriate timing so as to switch the state of the chuck 5. A timing of outputting a command to a robot arm 7 may be determined based on internal or external timing signal of the transferring system 110. A trajectory of the chuck 5 based on the operation of the robot arm 7 may be appropriately determined in advance.

As described above, the transferring system 110 includes an imager 81 that captures an image of a frame 2 held by the chuck 5 and positioned at an imaged position, and a correction value determining unit 9. The correction value determining unit 9 determines, based on an image captured by the imager 81, a position of a target portion of the frame 2 on the image and determines, based on the determined position on the image, at least one correction value for causing a change in a release position of a frame 2 when the frame 2 is released onto a shelf plate 1. The position of the target portion on the image may be an absolute position or a relative position of a target portion on the image. The absolute position of the target portion on the image can be expressed as coordinate(s) designating a position of the target portion on the image. The absolute position of the target portion on the image may occasionally be expressed by approximated coordinate(s). The relative position of the target portion on the image can be expressed by an interval or distance between a position of the target portion on the image and a reference position predetermined on the image. The relative position of the target portion on the image may be expressed by an approximated interval or distance.

The correction value determining unit 9 determines, based on the determined position on the image, at least one correction value for causing a change in a release position of a frame 2 when the frame 2 is released onto a shelf plate 1. Based on the captured image by the imager 81, a shift can be applied to a release position of the frame 2 when the frame 2 is released onto a shelf plate 1. Current position or target position or trajectory of the chuck 5 is modified in accordance with the determined correction value, increasing an accuracy of a release position of the frame 2.

Figure 3:
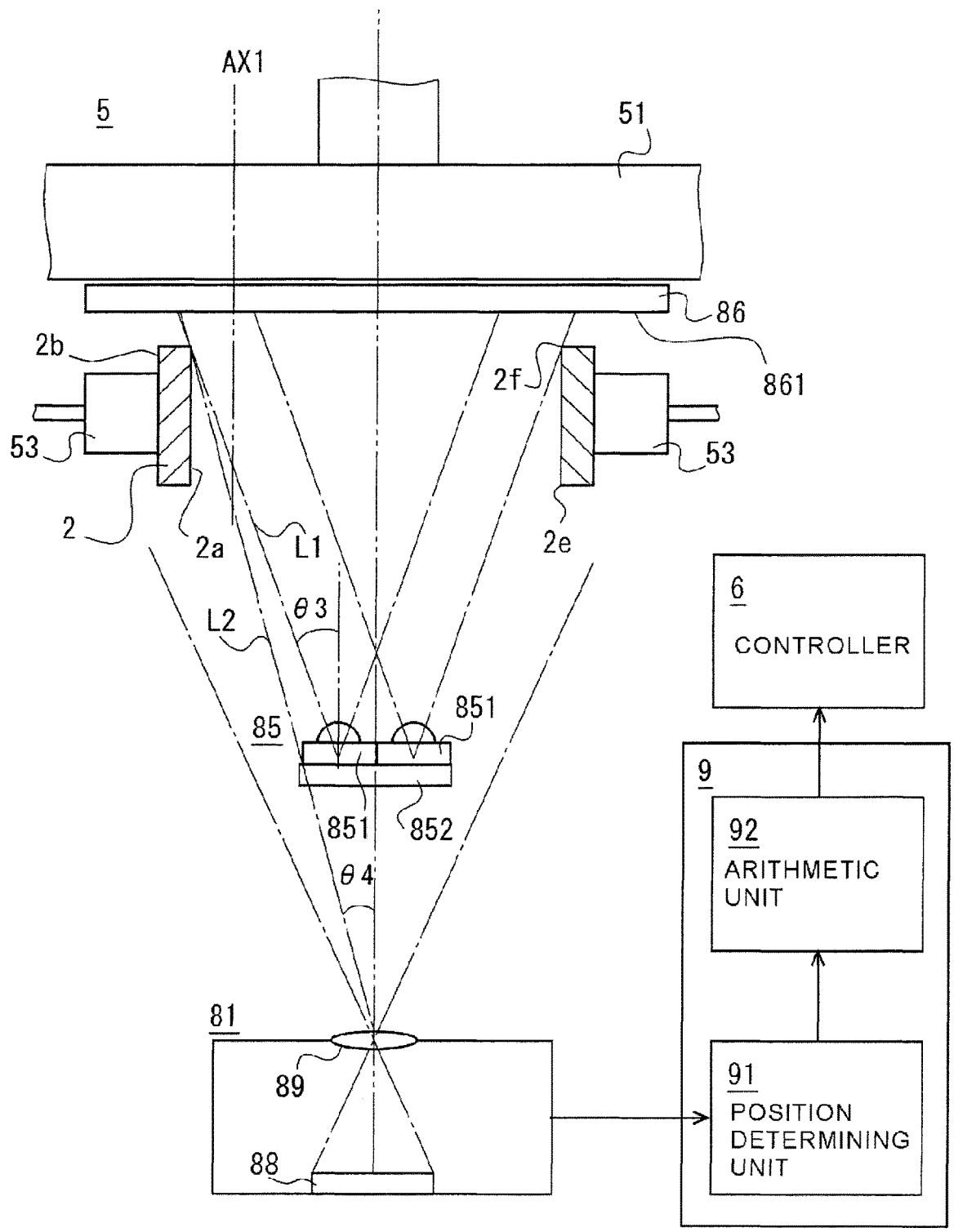
FIG. 3 is diagram showing more specific configuration of an illumination unit and an imager in a transferring system according to an aspect of the present disclosure. Shadow of frame caused by illumination light emitted from an illumination unit is positioned outward of an inner wall surface of the frame so as not to be captured by the imager.

The correction value determining unit 9 has a position determining unit 91 and an arithmetic unit 92 (See FIG. 3). The position determining unit 91 determines a position of a target portion of the frame 2 on an image based on an image captured by the imager 81. When an absolute position is used, the position determining unit 91 determines coordinates of target portions on the image, respectively for two or more target portions. When a relative position is used, the position determining unit 91 determines two or more intervals between the target portion and the reference position on the image. Based on the determined position, the arithmetic unit 92 calculates at least one correction value for causing a change in a release position of a frame 2 when the frame 2 is released onto a shelf plate 1. The position determining unit 91 and the arithmetic unit 92 are the same or different computer sections or program sections. The correction value determining unit 9 may be a computer section or program section that is same as or different from the controller 6. In other words, a part of or the entirety of the correction value determining unit 9 may be embedded into the controller 6.

The imager 81 captures an image of a frame 2 held by the chuck 5. Interval is determined based on the image captured by the imager 81. The imager 81 may have an imaging sensor 88 such as CMOS (Complementary Metal Oxide Semiconductor) imaging sensor or CCD (Charge Coupled Device) imaging sensor, and at least one optical system 89. The optical system 89 may have a zoom optical system, an object lens or other optical elements. The imager 81 may have one or more semiconductor chips (not-illustrated). The semiconductor chip may include a signal processor or a filter circuit or communication interface for processing analog or digital signal read out from the imaging sensor 88. The imager 81 may capture an image of a frame 2 held by the chuck 5 and positioned at an imaged position. In accordance with a timing signal supplied from the external signal source, the imager 81 captures an image of a frame 2 while the frame 2 moves or captures successive images thereof for a certain time window or at constant time interval. Accordingly, it may be avoided that an image of a frame 2 is not captured. An imaging sensor 88 included in an imager 81 may have a resolution equal to or greater than 4K resolution.

The correction value determining unit 9 may be configured by a software or hardware of cooperation of these, as a skilled person in the art would understand. In some cases, step(s) performed by the correction value determining unit 9 may be performed by a computer. The computer may include one or more CPUs (Central Processing Unit) and one or more memories. A memory may include a hard drive, semiconductor memory, magnetic recording medium, optical recording medium and the like. Program read out from a memory may be executed by CPU such that a software processing of the correction value determining unit 9 is performed. An embodiment is envisaged where the computer is a cloud computer capable of communicating with the imager 81 and the controller 6 through Internet.

The imager 81 and the correction value determining unit 9 are coupled via a wire or wirelessly or via a network. Output of the imager 81, i.e. data of image captured by the imager 81 is processed by an application of the correction value determining unit 9. Based on the processing of the image data by the application, a position of a target portion of the frame 2 on the image is determined. Then, based on this determined position, at least one correction value is determined which is for causing a change in a release position of a frame 2 when the frame 2 is released onto a shelf plate 1. The processing of the image data by the application may include an edge detection processing for determining a position of a target portion on the image. The correction value may be determined based on a calculation formula or algorithm.

Absolute position of the target portion on the image can be determined based on pixel-based coordinate(s) on the imaging sensor 88 for example, but not necessarily limited to this. The pixel-based coordinate(s) may be high-resolution coordinate(s) configured based on coordinate(s) designating a position of pixel. Relative position of the target portion on the image can be determined based on a pixel-based interval or distance between a reference position set on the image and a position of a target portion, but not necessarily limited to this. The reference position may be a position inside of the frame, for example.

In some cases where relative position is used, N (N indicates two or more natural number) intervals may be determined which are between N target portions in the frame 2 held by the chuck 5 and M (M indicates two or more natural number and equal to or less than N) reference positions. The below cases are envisaged.

(i) First interval between a first target portion and a first reference position in a frame 2 held by the chuck 5, and additionally second interval between a second target portion and a second reference position in a frame 2 held by the chuck 5 are determined; and (ii) First interval between a first target portion and a first reference position in a frame 2 held by the chuck 5, and additionally third interval between a third target portion and the first reference position in a frame 2 held by the chuck 5 are determined.

In a case of (i), different reference positions are respectively used for different intervals to be determined. In a case of (ii), the same reference position is used for different intervals to be determined. In accordance with a shape of a frame 2, various combination of (i) and (ii) are envisioned.

Figure 4:
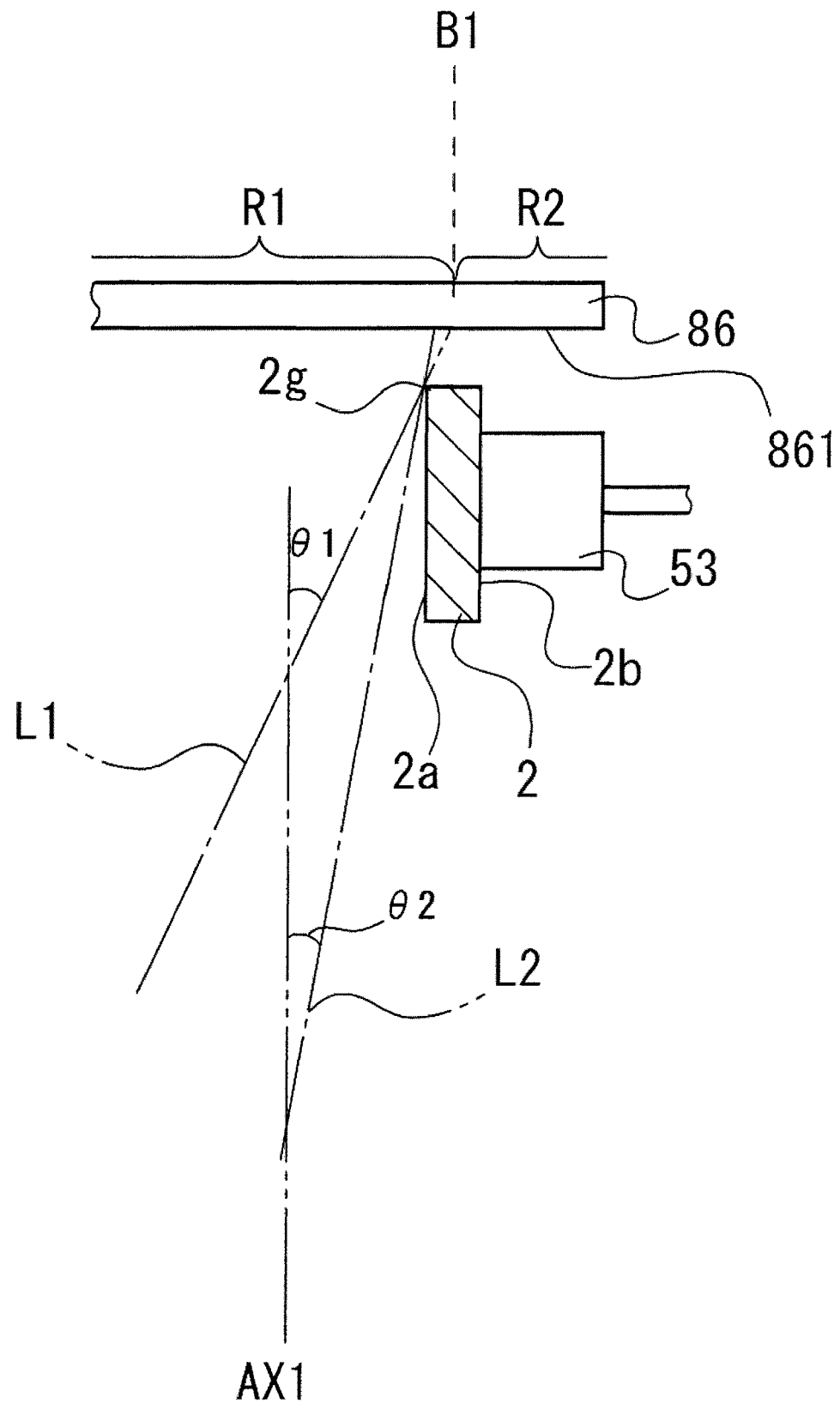
FIG. 4 is a diagram showing that a boundary between a reflecting section and a shadow section formed in a reflective face of a reflective plate in a transferring system according to an aspect of the present disclosure is positioned outward of the inner wall surface of the frame.

FIG. 3 is diagram showing more specific configuration of the illumination unit 85 and the imager 81 in the transferring system 110. A shadow of the frame formed by illumination light emitted from the illumination unit 85 is positioned outward of the inner wall surface 2a of the frame 2 so as not to be captured by the imager 81. FIG. 4 is a diagram showing that a boundary B1 between a reflecting section R1 and a shadow section R2 formed in a reflective face 861 of a reflective plate 86 in the transferring system 110 is positioned outward of the inner wall surface 2a of a frame 2.

The illumination unit 85 is arranged between the imager 81 and an imaged position for the frame 2. The illumination unit 85 is arrange to illuminate a space surrounded by the inner wall surface 2a of the frame 2. The illumination unit 85 includes one or more light sources 851 and a base 852 to which the one or more light sources 851 are secured. The light source 851 may be an incandescent lamp, fluorescent lamp, or LED light source, for example. The LED light source may include a LED chip and at least one lens for projecting an emitted light from the LED chip. In some cases, two or more light sources 851 are secured onto the base 852, ensuring a sufficiently larger illumination area. The inner wall surface 2a of the frame 2 has a first side 2e that is closer to the imager 81 and a second side 2f that is positioned farther away from the imager 81. In particular, the target portion may be the second side 2f of the inner wall surface 2a of the frame 2.

Common axial line AX1 is set which extends in parallel to the inner wall surface 2a of the frame 2 (See FIGS. 3 and 4). Additionally or alternatively, the axial line AX1 is parallel to an optical axis of an optical system included in the illumination unit 85 and/or is parallel to an optical axis of an optical system included in the imager 81. First angle θ1 between the axial line AX1 and a light ray L1, emitted from the illumination unit 85 and passing nearby and inward of the second side 2f of the frame 2 at the imaged position, is greater than a second angle θ2 between the axial line AX1 and an optical path L2, directed from the second side 2f of the frame 2 at the imaged position to an optical system of the imager 81 (See FIG. 4). In some cases, the angle θ1 between the axial line AX1 and the light ray L1 is equal to an angle θ3 between the light ray L1 and the optical axis of the optical system of the illumination unit 85 (See FIG. 3). Likewise, the angle θ2 between the axial line AX1 and the optical path L2 is equal to an angle θ4 between the optical path L2 and the optical axis of the optical system of the imager 81. In some cases as such, a shadow of the frame 2 formed by the illumination light emitted from the illumination unit 85 is positioned outward of the inner wall surface 2a of the frame 2 so as not to be captured by the imager 81. The shadow of the frame 2 is prevented from being imaged in an image captured by the imager 81, enhancing an accuracy of position of a target portion that is determined based on an image captured by the imager 81. It should be noted that it is not a requisite that the shadow of the frame 2 is positioned outward of the inner wall surface 2a of the frame 2 so as not to be imaged by the imager 81 in the entire peripheral length along the frame 2. In one section of the frame along the circumferential direction, it is allowed that a shadow of the frame 2 is imaged by the imager 81. Even in such a case, a position of a target portion on the image can be determined within a tolerable extent of accuracy. For example, even when a shadow of a given section of the frame 2 along the circumferential direction is imaged by the imager 81 and an error is included in the determined positon of the target portion on the image, as far as a shadow of another section of the frame 2 along the circumferential direction is NOT imaged by the imager 81 and a position of the target portion on the image is accurately determined, then an error as a whole would be lessened.

Even in a case where the angle θ3>angle θ4 is not satisfied, the illumination unit 85 may be positioned and oriented properly between the imager 81 and the imaged position of the frame 2 so that a shadow of the frame 2 formed by the illumination light emitted from the illumination unit 85 is positioned outward of the inner wall surface 2a of the frame 2 so as not to be captured by the imager 81.

The chuck 5 may optionally be provided with a reflective plate 86 for reflecting a light that has been emitted from the illumination unit 85 and transmitted through the inside of the frame 2. Accordingly, the imager 81 can more clearly capture an image of the inner wall surface 2a of the frame 2 that is a target portion. The reflective plate 86 has at least one reflective face 861. The reflective plate 86 can be variously attached to the chuck 5. The reflective face 861 may be a diffuse reflection surface or a mirror surface. By attaching the reflective plate 86 to the chuck 5, collision or interference between the reflective plate 86 and the chuck 5 would be avoided. The illumination unit 85 emits a light ray that passes nearby and inward of the inner edge 2g (See FIG. 4) of the frame 2 positioned at the reflective plate 86 side. It should be noted that the reflective plate 86 is provided not to interfere with the operation of the chuck 5.

As shown in FIG. 4, a reflective face 861 of the reflective plate 86 is divided into and includes a reflecting section R1 and a shadow section R2 where a shadow of the frame 2 is projected. A boundary B1 between the reflecting section R1 and the shadow section R2 is positioned outward of the inner wall surface 2a of the frame 2. An embodiment is envisaged where a boundary B1 between the reflecting section R1 and the shadow section R2 is positioned outward of the outer wall surface 2b of the frame 2.

Figure 5:
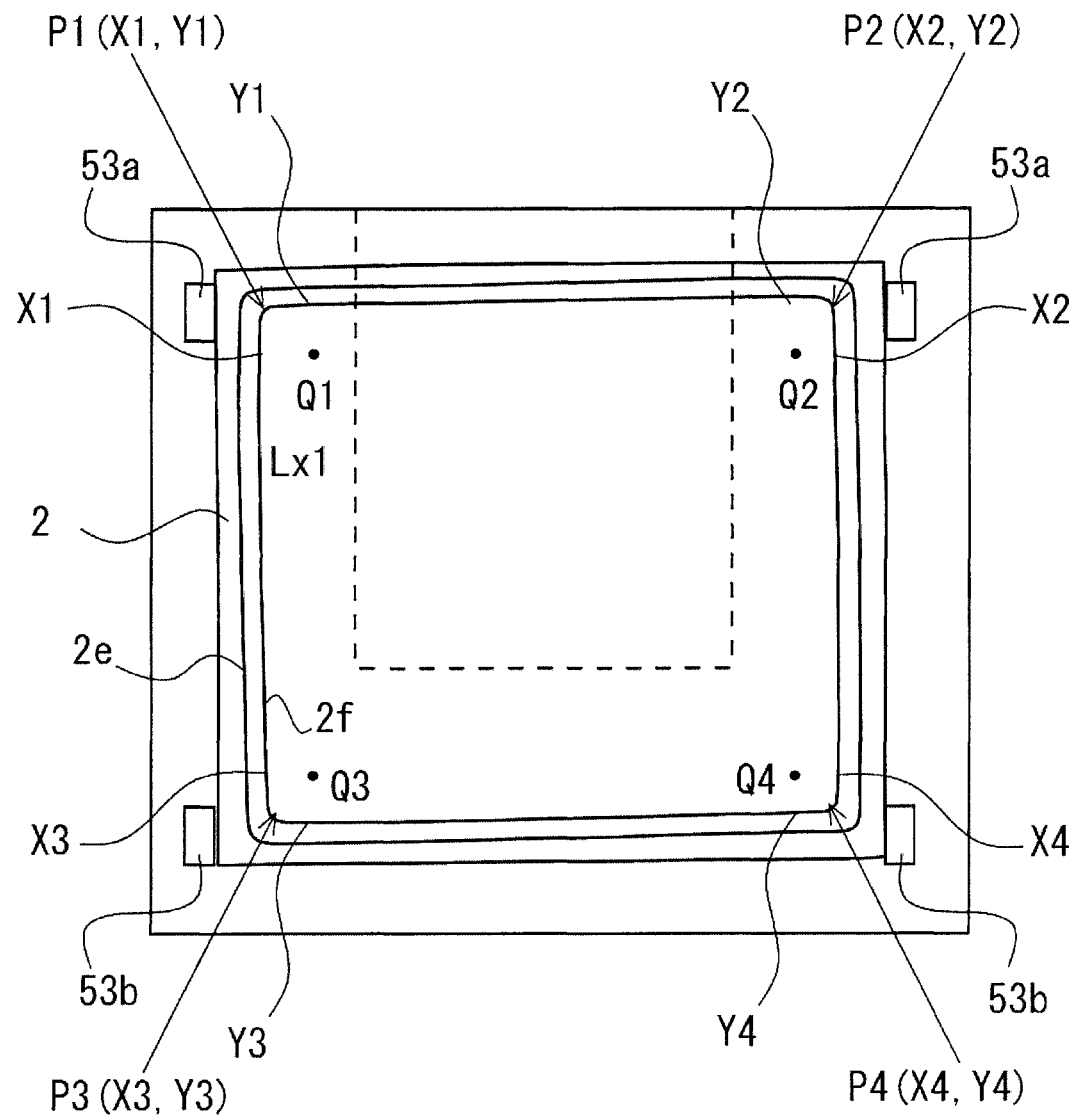
FIG. 5 is a diagram showing that, based on an image captured by an imager, an absolute position of a target portion of the frame on the image is determined.

FIG. 5 is a diagram showing that, based on an image captured by the imager 81, an absolute position of a target portion of a frame 2 on the image is determined. As shown in FIG. 5, the chuck 5 has two pairs of contact portions 53, i.e. first pair of contact portions 53a and second pair of contact portions 53b. By reducing the interval between the first pair of contact portions 53a, the frame 2 is sandwiched between the contact portions 53a. By reducing the interval between the second pair of contact portions 53b, the frame 2 is sandwiched between the contact portions 53b. It is assumed that reduction of the interval between the first pair of contact portions 53a and reduction of the interval between the second pair of contact portions 53b initiate simultaneously. If a deformation is caused in a frame 2, a difference may be caused in contact timings with the frame 2 between the contact portions 53a, 53b. When a frame 2 is grasped by the chuck 5, the frame 2 may be displaced or rotated relative to the chuck 5 due to the deformation of the frame 2. This may invite a reduced accuracy of release position of the frame 2. Compared to a case where respective contact portions 53 touch a rectangular frame 2 simultaneously, reduction in accuracy of release position may be evident.

Figure 6:
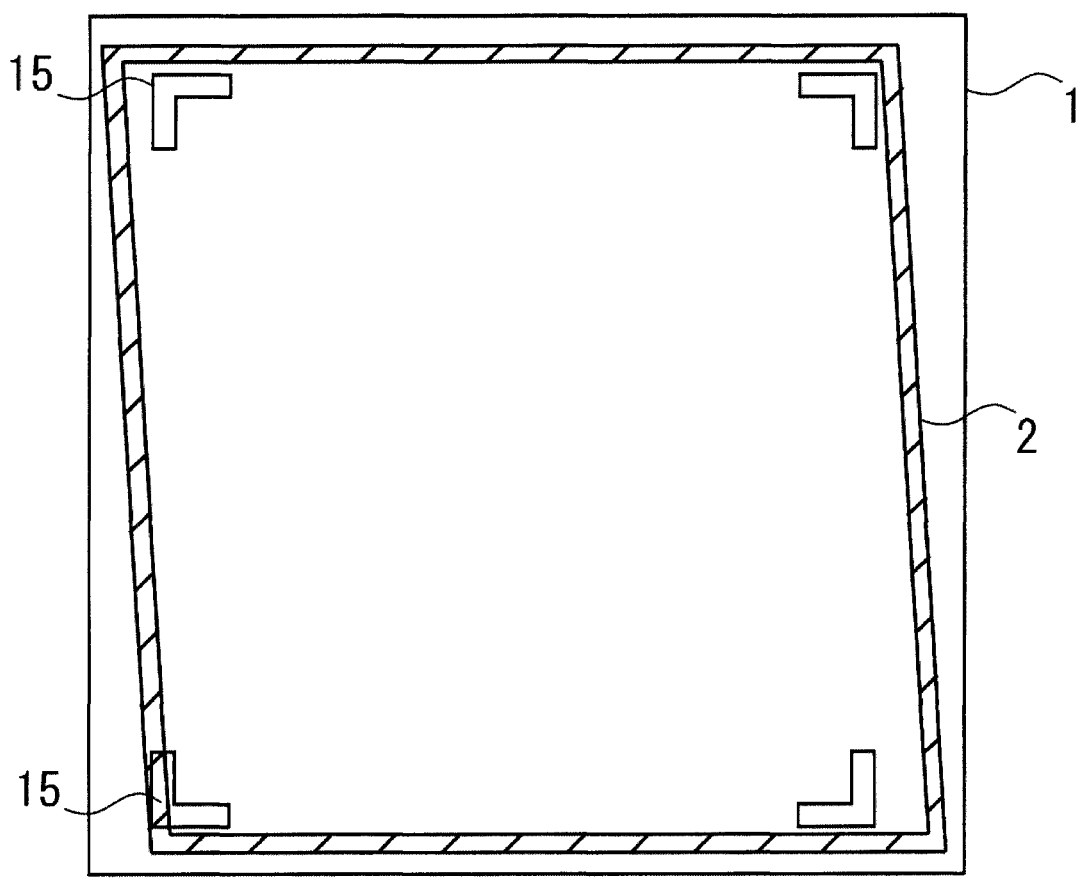
FIG. 6 is a diagram showing a condition where a deformed frame is inappropriately arranged onto a shelf plate.
Figure 7:
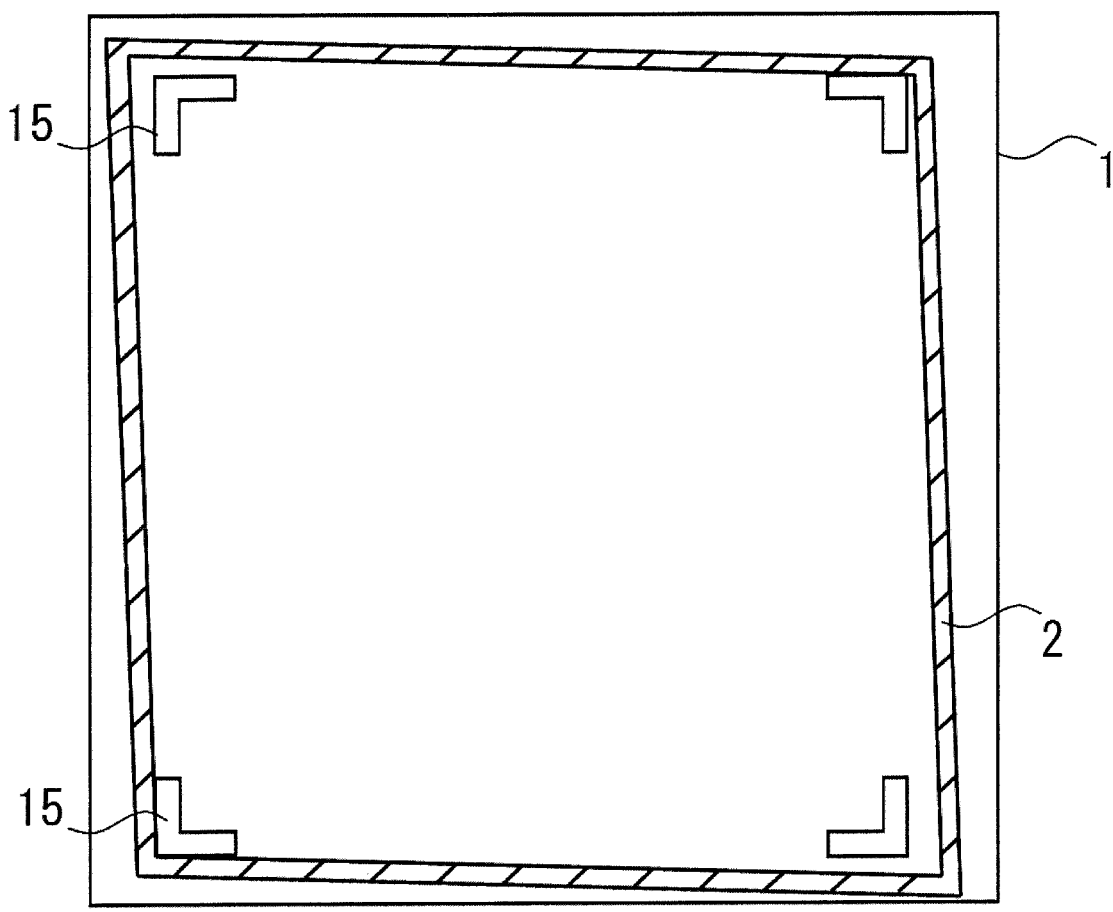
FIG. 7 is a diagram showing a condition where a deformed frame is appropriately arranged onto a shelf plate.
Figure 11:
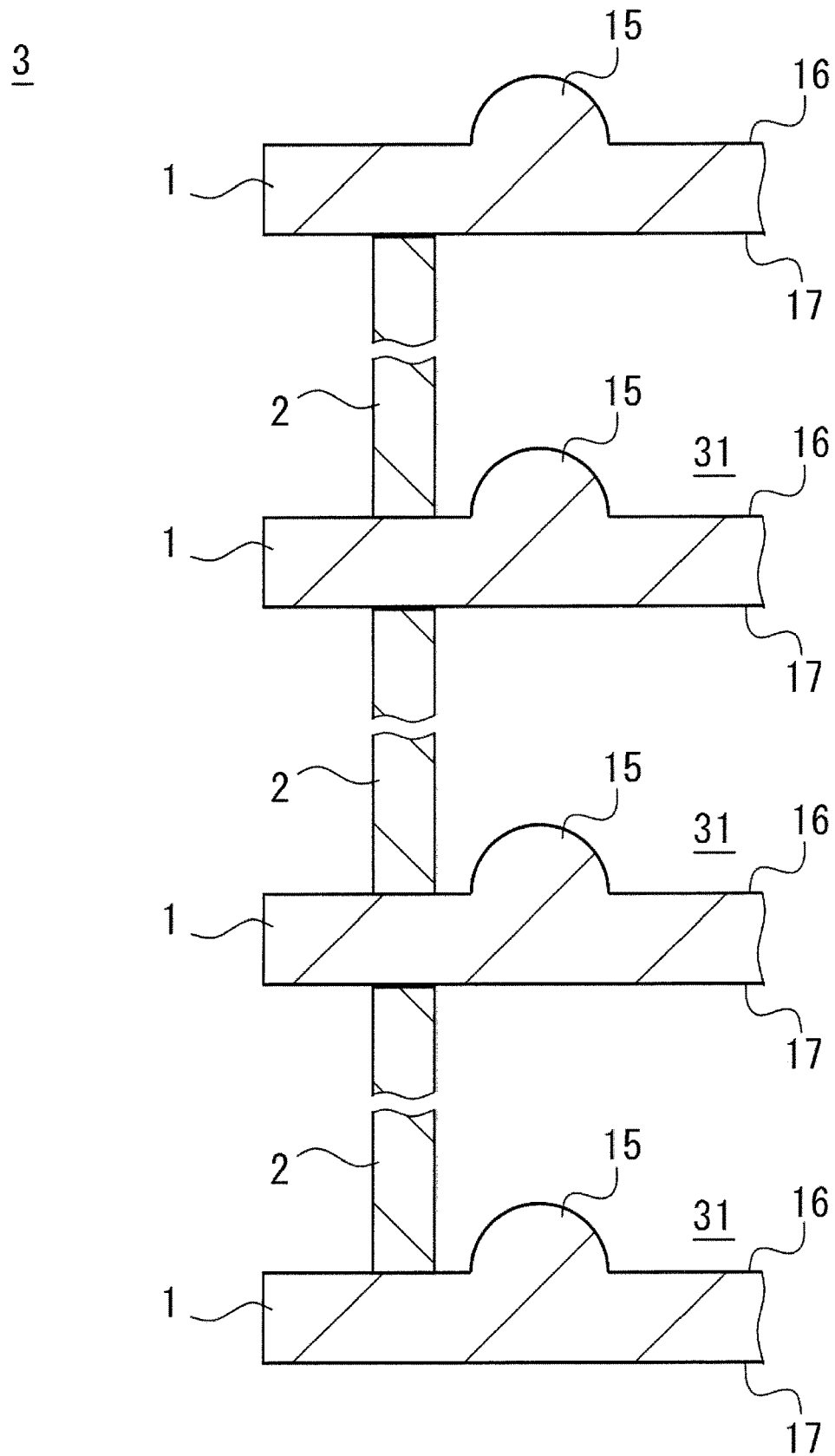
FIG. 11 is a cross-sectional schematic view showing that a protrusion for restricting a position of a frame is provided onto a top surface of a shelf plate in a housing shelf according to an aspect of the present disclosure.

FIG. 6 is a diagram showing a condition where a deformed frame 2 is inappropriately arranged onto a shelf plate 1. There is a case where the shelf plate 1 is provided with at least one protrusion 15 so as to restrict the position of the frame 2 on the shelf plate 1 (see FIG. 11). In the case shown in FIG. 6, the frame 2 being placed on the shelf plate 1 is placed on the protrusion, and therefore a space is formed between the shelf plate 1 and the frame 2, and a shelf plate 1 to be placed at an upper layer may be slanted. The space between the shelf plate 1 and the frame 2 may allow an atmosphere of a housing space 31 (See FIG. 11), defined by shelf plates 1 adjacent in the vertical direction and a frame 2 interposed between the shelf plates 1, to an inner atmosphere of a firing kiln, possibly resulting in firing defects such as color change and the like of the ceramic body 700 (See FIG. 10). FIG. 7 shows a condition where a deformed frame 2 is appropriately arranged onto a shelf plate 1 as current position, target position or trajectory of the chuck 5 has been changed in accordance with a correction value determined by the correction value determining unit 9. It should be noted that it is a requirement that a protrusion 15 is provided on the shelf plate 1, and any specific shape or arrangement of protrusion 15 would be possible.

Further description would be followed with reference to FIG. 5. FIG. 5 shows an image of one frame. This image shows the inner wall surface 2a of the frame 2 that is a target portion. Also, the first side 2e and the second side 2f are shown. As a non-limiting example, the target portion is a junction of second sides 2f identified by P1-P4. Edge line of the second side 2f of the frame 2 may be determined based on processing of image data, in particular edge detection processing by an application. Junction P1 of the second sides 2f may be determined by x-coordinate of one second side 2f extending along the y-axis and y-coordinate of another second side 2f extending along the x-axis. The same applied to other junctions P2-P4 of the second sides 2f.

Intervals between reference positions Q1-Q4 and target portions X1-X4, Y1-Y4 of the frame 2 can also be determined. The target portion is an inner wall surface of the frame 2, in particular, the second side 2f. Edge line of the second side 2f of the frame 2 may be determined based on processing of image data, in particular edge detection processing by an application. The target portions X1-X4, Y1-Y4 can be determined based on coordinates of reference position Q1-Q4 and the edge line determined based on the image processing. The target portion X1 is on the edge line and have a y-coordinate that is identical to the y-coordinate of the reference position Q1. The target portion Y1 is on the edge line and have an x-coordinate that is identical to the x-coordinate of the reference position Q1. For the second reference position Q2 and the target portion X2, Y2, similar description would be applied. For the third reference position Q3 and the target portion X3, Y3, similar description would be applied. For the fourth reference position Q4 and the target portion X4, Y4, similar description would be applied.

Intervals between the reference positions Q1-Q4 and the target portions X1-X4,Y1-Y4 can be determined based on the coordinates of the reference positions Q1-Q4 and the coordinates of the target portions X1-X4,Y1-Y4, but not necessarily limited to this. By using an appropriate application, the minimum interval from the reference position to the edge line can be determined. This minimum interval corresponds or matches the above-described interval. The interval may be determined by other method not disclosed in the present specification.

Position of the target portion on the image may be determined based on pattern-matching performed by software application. For example, a rectangular standard pattern can be piled onto a rectangular pattern object formed from 4 edge lines corresponding to the second sides 2f. It is assumed that the target portion is a junction of the second sides 2f of the inner wall surface 2a of the frame 2. The coordinates of corners of the standard pattern being piled onto the rectangular pattern object formed from the 4 edge lines corresponding to the second sides 2f. Even in such a case, it could be said that a position of the target portion on the image is determined based on the image captured by the imager 81.

An image of the base 852 to which the light source 851 is secured is captured as shown by dotted line in FIG. 5. However, this does not influence the determination of the position of the target portion on the image.

Based on the determined position, the arithmetic unit 92 calculates at least one correction value for causing a change in a release position of the frame 2 when the frame 2 is released onto a shelf plate 1. The correction value may be any value related to a magnitude of displacement of the chuck 5. For example, a correction value related to a center coordinate and a rotation angle (rotational position) may be determined. For example, the center coordinate is determined by Xc,Yc below, and a rotational angel (rotational position) is determined by θ below. The correction value is determined based on comparison, i.e. subtraction of the determined center coordinate and a target center coordinate. Likewise, the correction value is determined based on comparison, i.e. subtraction of the determined rotational angle (rotational position) and a target rotational angle (rotational position). As such, the correction value can be a difference between a measured value and a target value.

$$Xc=(x1+x2+x3+x4)/4$$

$$Xc=(y1+y2+y3+y4)/4$$

$$\theta=\{((y2-y1)/(x2-x1))+((y4-y3)/(x4-x3))-((x3-x1)/(y3-y1))-((x4-x2)/(y4-y2))\}/4$$

Any one or all correction values may be transmitted to the controller 6, causing the chuck 5 to be displaced. The displacement of the chuck 5 in accordance with the correction value results in displacement of the frame 2 in a horizontal direction perpendicular to the vertical direction when the frame 2 is released from the chuck 5, and/or results in rotation of the frame 2 around the vertical direction when the frame 2 is released from the chuck 5. Changing a position of the chuck 5 based on the correction value may be achieved by changing a current position, target position, or trajectory of any combination thereof of the chuck 5. Therefore, when a position of the chuck 5 is regulated in accordance with the correction value, the frame 2 is moved by a distance that is in accordance with the correction value in a given direction. Such regulation of position of the chuck 5 may cause, as a result, a change in a release position of the frame 2 when the frame 2 is released from the chuck 5.

Performed may be any one of or combination of a regulation of position of the chuck 5 in x-direction, a regulation of position of the chuck 5 in y-direction, and a regulation of position of the chuck 5 in a rotational direction. If any one of the regulation of position of the chuck 5 in x-direction, the regulation of position of the chuck 5 in y-direction, and the regulation of position of the chuck 5 in a rotational direction have greater influence than others, then weighting may be performed. In this case, a gain coefficient may be introduced into a calculation formula for a correction value.

The correction value calculated by the arithmetic unit 92 may be transmitted to the controller 6 via a wire or wirelessly or via a network. The controller 6 controls the current position, target position, or trajectory of the chuck 5, in accordance with the received correction value. In more detail, the controller 6 controls the robot arm 7 in accordance with the correction value so that a change is caused on the current position, target position or trajectory of the chuck 5. As a result, in accordance with the correction value, displacement of the frame 2 is caused in the horizontal direction perpendicular to the vertical direction when the frame 2 is released from the chuck 5, and/or rotation of the frame 2 is caused around the vertical direction when the frame 2 is released from the chuck 5.

Figure 8:
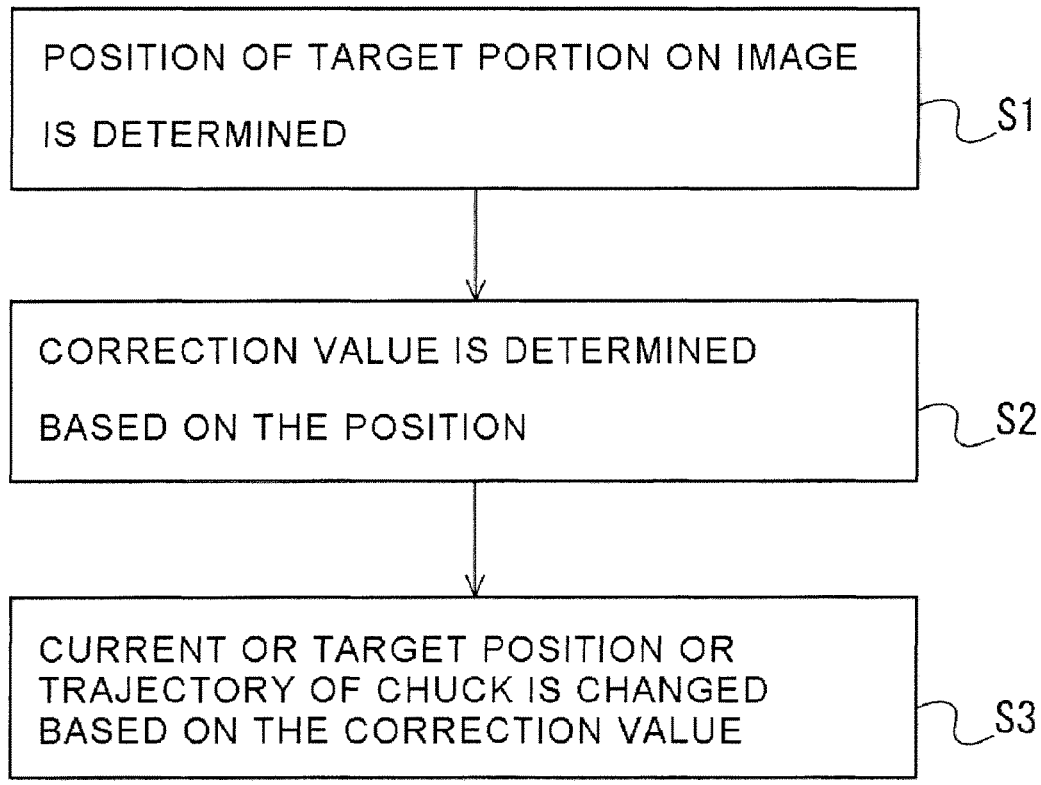
FIG. 8 is a schematic flowchart showing an operation of a transferring system according to an aspect of the present disclosure.

FIG. 8 is a schematic flowchart showing an operation of a transferring system 110. At step S1, a position of the target portion on the image is determined. As step S2, based on the position of the target portion on the image, a correction value is determined. A plurality of correction value may be individually calculated or may be calculated at once. An algorithm may be used that outputs a plurality of output values in accordance with plural inputs. Algorithms such as neural network can be employed. At step S3, current position, target position or trajectory or any combination thereof of the chuck 5 is changed based on the correction value.

Figure 9:
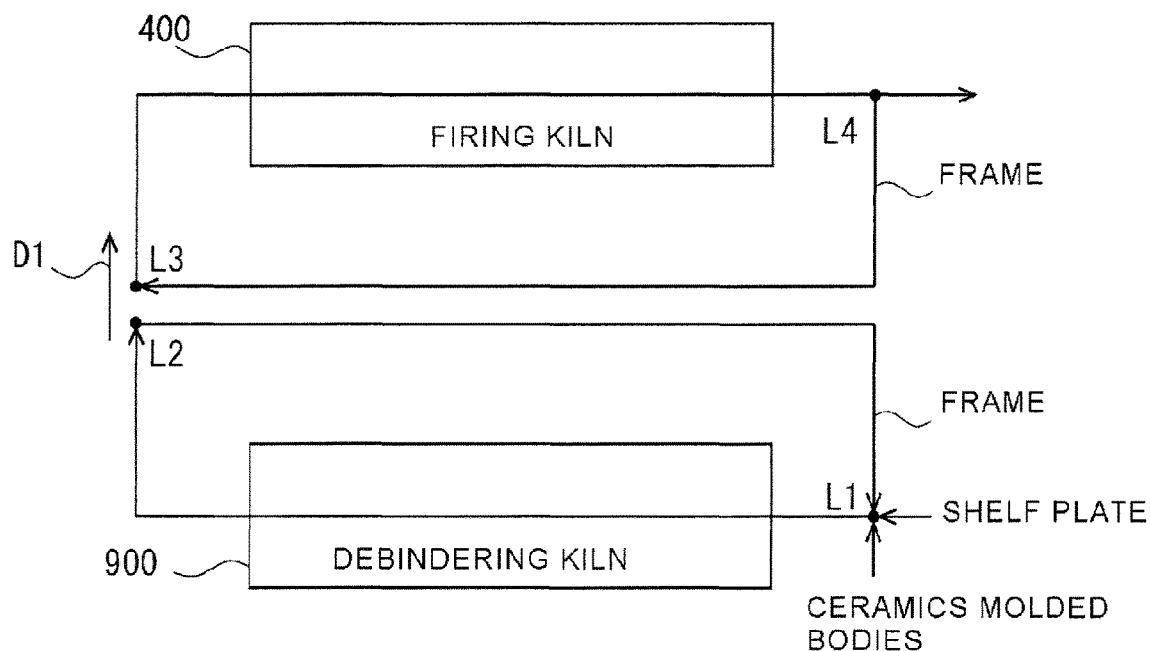
FIG. 9 is a diagram showing a production line and production process of a ceramic fired body according to an aspect of the present disclosure. Housing shelf is moved between first and second locations L1, L2 for passing through a debindering kiln. Frames, taken out from a housing shelf that has passed through the debindering kiln, are moved between the second location L2 and the first location L1. Frames, taken out from a housing shelf that has passed through a firing kiln, are moved between a fourth location L4 and a third location L3. Housing shelf is moved between the third location L3 and the fourth location L4 for passing through a firing kiln. Roller conveyor or belt conveyor may be used for moving the housing shelf and the frames.

The transferring system 110 according to the present disclosure may be introduced into a production line of ceramic fired bodies. In FIG. 9, housing shelf is moved between first and second locations L1, L2 for passing through a debindering kiln. Frames, taken out from a housing shelf that has passed through the debindering kiln, are moved between the second location L2 and the first location L1. Frames, taken out from a housing shelf that has passed through a firing kiln, are moved between a fourth location L4 and a third location L3. Housing shelf is moved between the third location L3 and the fourth location L4 for passing through a firing kiln. The transferring system 110 assembles a new housing shelf 3 to be moved through a firing kiln 400, using shelf plates 1 taken out from a housing shelf 3 transferred to the second location L2 and frames 2 transferred to the third location L3. For assembling a new housing shelf 3, the chuck 5 may include a step of releasing a frame onto a shelf plate and a step of releasing another shelf plate onto the frame. Release of a frame onto a shelf plate and release of a shelf plate onto a frame may be performed alternately. FIG. 10 is one example of a newly assembled housing shelf 3. Debindered ceramic bodies in the debindering kiln are arranged onto a shelf plate 1. Additionally or alternatively, the transferring system 110 may be utilized to disassemble a housing shelf 3 transferred to the fourth location L4, taking out frame 2 from the housing shelf 3 and stacking these frames 2. Note that a method of producing a ceramic fired body may include a step in which a housing shelf passes through a firing kiln, and a step of taking out a ceramic body from the housing shelf which has passed through the firing kiln.

The shelf plate 1 and the frame 2 may be made of fire resistance material. The shelf plate 1 and/or the frame 2 may include silicon carbide (SiC) or alumina ($Al_2O_3$) or mullite ($3Al_2O_3.2SiO_2$), or sintered silicon carbide (SiC) or sintered alumina ($Al_2O_3$) or sintered mullite ($3Al_2O_3.2SiO_2$), not necessarily limited to this though. Silicon carbide (SiC) included in a shelf plate 1 and/or a frame 2 may be any one of or any combination of reaction sintered Si—SiC, recrystallized SiC (Re—SiC), and nitride-coupled SiC (N—SiC). In particular, a frame 2 in some cases includes or is made of alumina ($Al_2O_3$) or mullite ($3Al_2O_3.2SiO_2$). In a case where the frame 2 is made of alumina or mullite alternatively to silicon carbide, decrease of weight of a frame 2 in accordance with increase of times the frame 2 passes through a firing kiln 400 would be moderate, possibly allowing the frame 2 to have a longer life time. In contrast, however, deformation of a frame 2 in accordance with increase of times the frame 2 passes through a firing kiln 400 can be greater. In cases where the housing space 31 is closed by the shelf plates 2 and the frame 2, a difference may be caused between an atmosphere temperature in a firing kiln and a temperature in the housing space 31, facilitating the deformation of frame 2.

Figure 12:
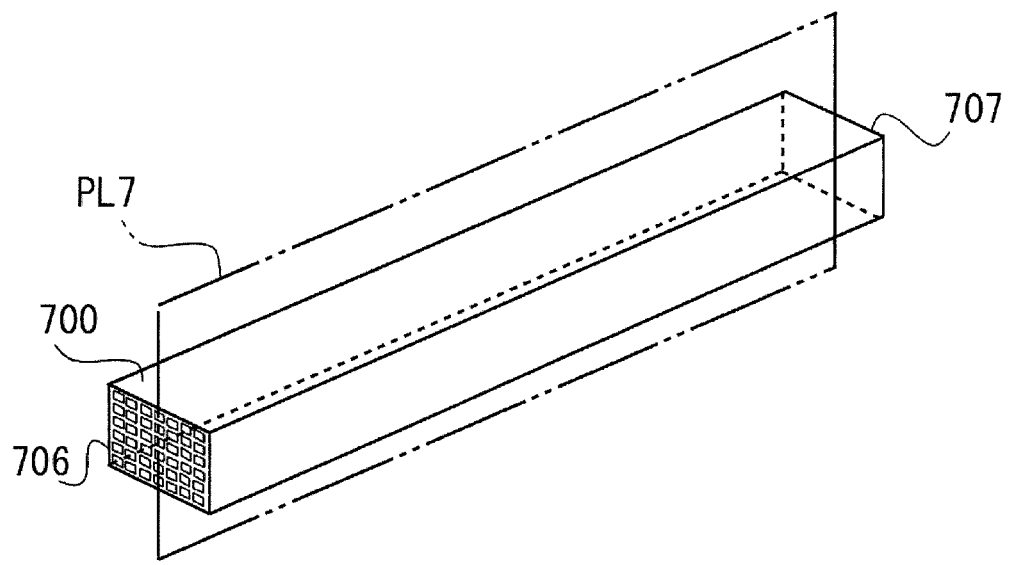
FIG. 12 is a schematic perspective view of a ceramic body to be placed onto a shelf plate.

FIG. 12 is a schematic perspective view of a ceramic body to be placed onto a shelf plate 1. The ceramic body 700 may be debindered in a debindering kiln 900, and then may be fired in a firing kiln 400. It is also envisaged that debindering and firing are continuously performed in the firing kiln 400, omitting the debindering kiln 900. In the debindering kiln 900, the ceramic body 700 is heated and organic binder included in the ceramic body 700 may be removed. The debindered ceramic body 700 may be fired in the firing kiln 400 so that ceramic material, e.g. particles of silicon carbide (SiC) may be sintered. The heating of the ceramic body 700 in the debindering kiln 900 may be performed in an oxidization atmosphere, e.g. air atmosphere, not necessarily limited to this through. Firing of the ceramic body 700 in the firing kiln 400 may be performed in a non-oxidization atmosphere, e.g. inert gas atmosphere such as Argon. Temperature inside the debindering kiln 900 during debindering of the ceramic bodies 700 may be equal to or less than 500° C. The temperature inside the firing kiln 400 during firing of ceramic bodies 700 may be equal to or greater than 1000° C. The debindering kiln 900 may be referred to as a first kiln and the firing kiln 400 may be referred to as a second kiln. Again, it is envisioned that the debindering kiln 900 is omitted.

The ceramic body 700 may be one that is produced through molding and drying of raw material. In some cases, raw material includes at least a clay or includes at least ceramic material, an organic binder, and water. The ceramic material may include at least one material or combination of material selected from a group consisting of silicon carbide (SiC), mullite ($3Al_2O_3.2SiO_2$), alumina ($Al_2O_3$), and zirconia ($ZrO_2$) or raw material that will be cordierite ($2MgO2Al_2O_35SiO_2$) through firing. Raw material that will be cordierite ($2MgO2Al_2O_35SiO_2$) through firing may be ceramic raw material that has been prepared to have a chemical composition which includes 40-60 mass % of silica, 15-45 mass % of alumina, and 5-30 mass % of magnesia. The organic binder may include at least one material selected from a group consisting of hydroxypropylmethylcellulose, methylcellulose, hydroxyethylcellulose, carboxymethylcellulose, polyvinyl alcohol and agar. A ceramic body 700 may be extruded by an extruding machine and then may be dried by a drying machine. Accordingly a ceramic body 700 may be produced which has a hardness allowing a human or machine to grasp.

The ceramic body 700 may have a lattice-like cell-wall 720 defining a plurality of cells 710, not necessarily limited to this through. Open shape of the cell 710 defined by the lattice structure of the ceramic body 700 may be a polygon or circle or oval. Polygon can be triangle, rectangle, pentagon, hexagon or others. The ceramic body 700 has a first end 706 and a second end 707 opposite to the first end 706, and extends between the ends 706, 707. The cells 710 extend along the extending direction of the ceramic body 700.

Figure 13:
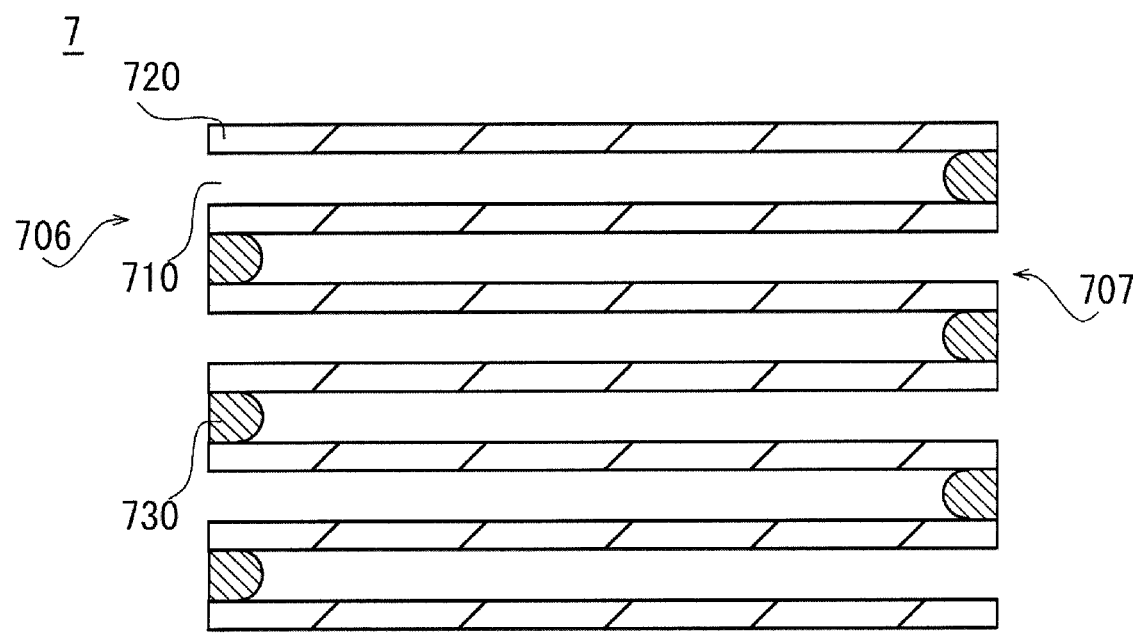
FIG. 13 is a cross-sectional schematic view of a ceramic body in a plane PL7 shown by a phantom line in FIG. 12.

Some cells 710 in the two-dimensional arrange of the cells 710 may be sealed by sealing members 730, not necessarily limited to this through. As shown in FIG. 13, sealing patter of the cells 710 by the sealing members 730 at the first end 706 of the ceramic body 700 and sealing patter of the cells 710 by the sealing members 730 at the second end 707 of the ceramic body 700 may be complimentary. Both permeation of exhaust gas and purification of exhaust gas in the filter 790 are facilitated. The first end 706 may be one end that is arranged closer to an engine in a flow direction of exhaust gas, and the second end 707 may be the other end that is arranged farther from the engine in the flow direction of exhaust gas.

In some cases, the ceramic body 700 may include at least a silicon carbide (SiC). In some cases, the ceramic body 700 is one that is not debindered, and includes an organic binder additionally to silicon carbide. In some cases, the ceramic body 700 is one that is debindered, and includes a remaining carbon component additionally to silicon carbide. The remaining carbon component may be a carbon content originating from the organic binder.

Figure 14:
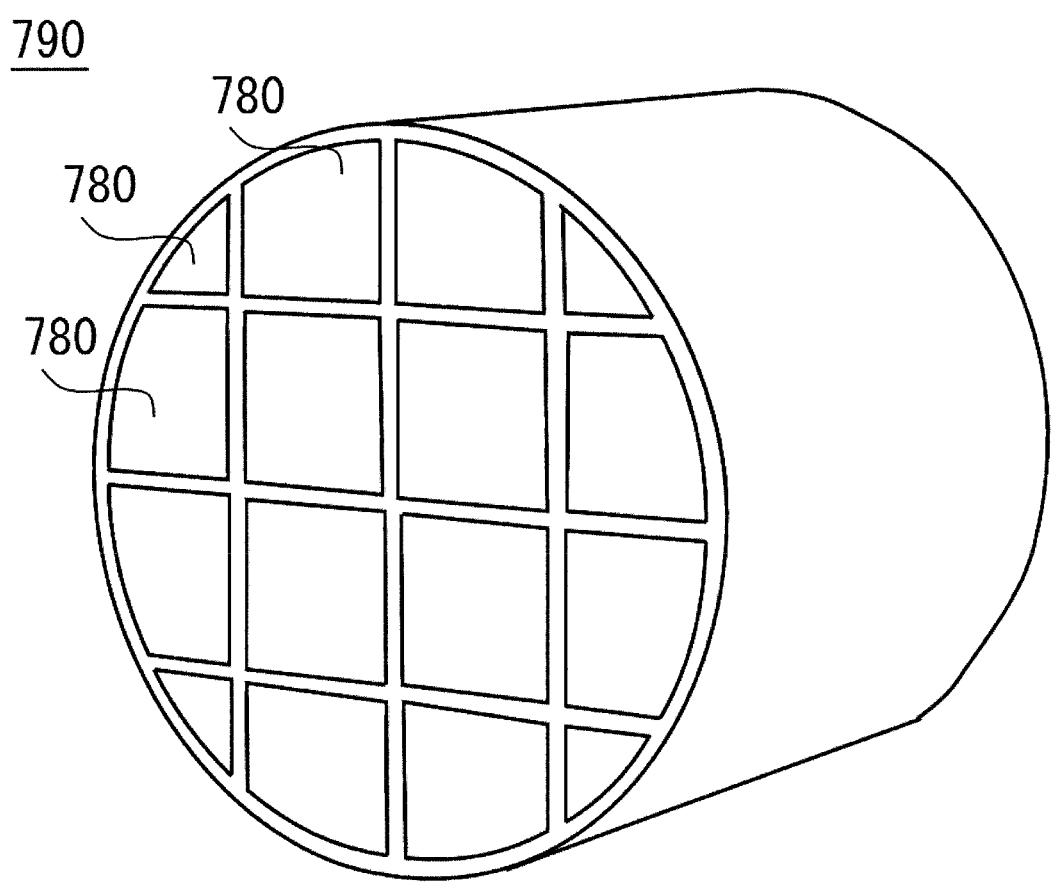
FIG. 14 is a schematic perspective view of a filter including ceramic fired bodies according to an aspect of the present disclosure.

A filter 790 shown in FIG. 14 may be produced from plural ceramic bodies 700. The filter 790 shown in FIG. 14 may be a functional part that catches and removes particulates, i.e. PM (Particulate Matter) included in an exhaust gas exhausted from an internal combustion engine such as a diesel engine. The ceramic fired bodies 780 are two-dimensionally arranged via adhesive; a resulting block is shaped into a cylinder, and finally an outer layer is coated to a peripheral surface of the cylinder and this would be fired, thereby the filter 790 is produced. The filter 790 should not be limited to an application for purifying an exhaust gas from a diesel engine, but may be used for other various applications such as for purifying a polluted water. It is also envisaged that various types of catalyst is introduced into the ceramic body 700 included in the filter 790. The adhesive layer and/or outer layer of the filter 790 may include raw material that will be cordierite ($2MgO2Al_2O_35SiO_2$) through firing.

Figure 15:
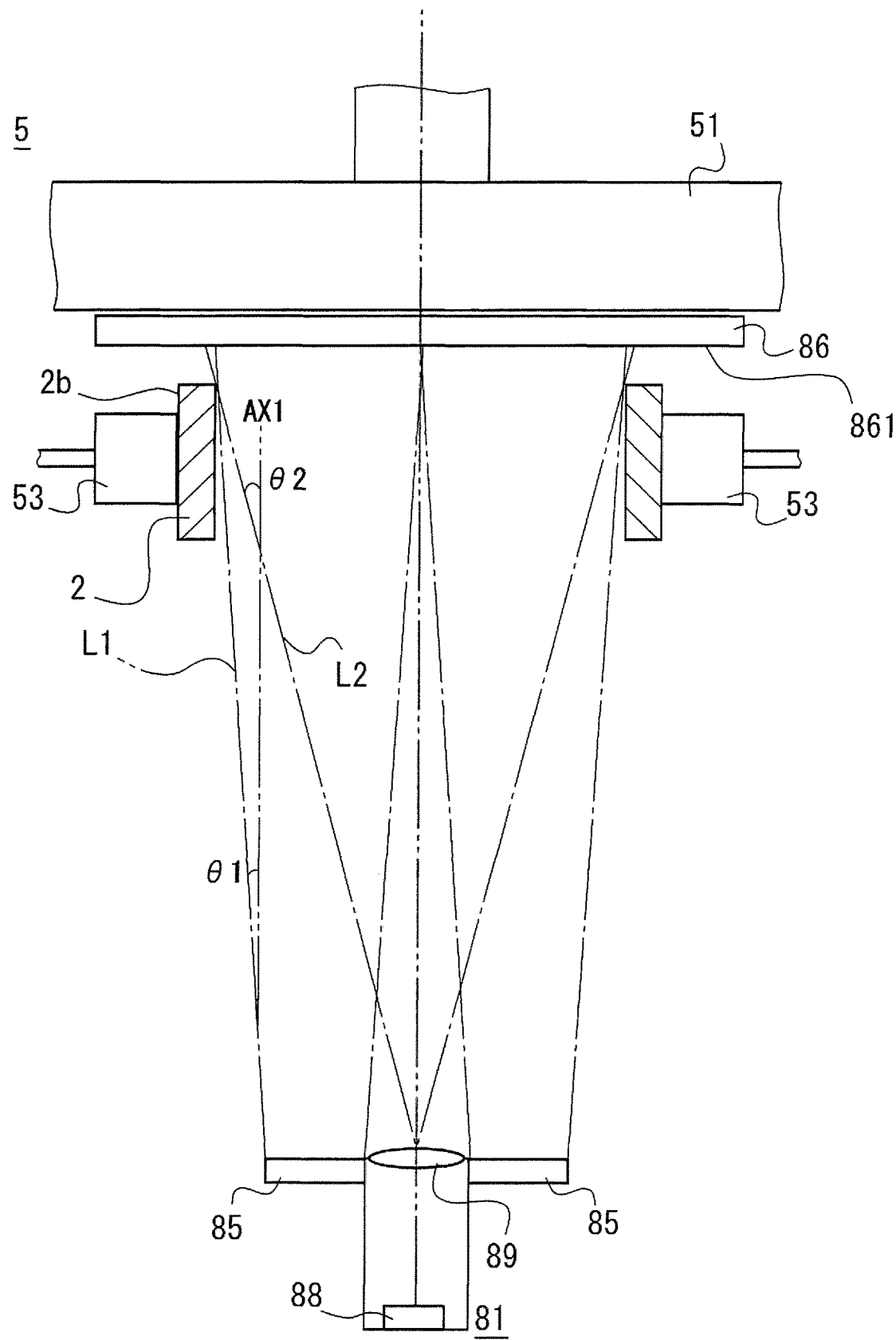
FIG. 15 is a schematic view of a transferring system according to a reference example.

FIG. 15 is a schematic view of a transferring system according to a reference example. In a case shown in FIG. 15, the first angle θ1 between the axial line AX1 and the light ray L1, emitted from the illumination unit 85 and passing nearby and inward of the second side 2$f$ of the frame 2, is less than the second angle θ2 between the axial line AX1 and the optical path L2, directed from the second side 2$f$ of the frame 2 at the imaged position to the optical system of the imager 81. Therefore, a shadow of the frame 2 formed by the illumination light emitted from the illumination unit 85 may be imaged by the imager 81. As an influence of the shadow, in the edge detection processing, it may be difficult to clearly identify the inner wall surface 2*a* of the frame 2, i.e. the second side 2$f$ that is a target portion. Reduced accuracy of position of the target portion results in reduced accuracy of the correction value, and in turn reduced accuracy of release position of the frame 2 when being released from the Chuck 5.

Based on the above disclosure, a skilled person would be able to add various modifications to the respective embodiments.

The invention claimed is:

1. A method of assembling or disassembling a housing shelf configured at least from shelf plates and frames, the method comprising:
   holding the frame by a chuck;
   determining, based on an image captured by an imager of the frame held by the chuck at an imaged position of the frame, a position of a target portion of the frame on the image; and
   determining, based on the position of the target portion of the frame on the image, at least one correction value for causing a change in a release position for the frame when the frame is released from the chuck onto the shelf plate, wherein
   the target portion of the frame is an inner wall surface of the frame,
   an illumination unit is arranged between the imager and the imaged position of the frame, and
   a shadow of the frame formed by an illumination light emitted from the illumination unit is positioned outward of the inner wall surface of the frame so as not to be captured by the imager.

2. The method of claim 1, wherein a first angle between a light ray and an axial line is greater than a second angle between an optical path and the axial line, said light ray being emitted from the illumination unit and passing nearby and inward of the target portion of the frame, and said optical path being directed from the target portion of the frame to an optical system of the imager.

3. The method of claim 2, wherein the axial line is parallel to the inner wall surface of the frame.

4. The method of claim 1, wherein the illumination unit includes one or more light sources, and a base to which the one or more light sources are secured.

5. The method of claim 4, wherein the base is captured in the image.

6. The method of claim 1, wherein the chuck is provided with a reflective plate for reflecting a light that has been emitted from the illumination unit and transmitted through an inside of the frame.

7. The method of claim 6, wherein the illumination unit emits a light ray that passes nearby and inward of an inner edge of the frame positioned at the reflective plate side of the chuck.

8. The method of claim 6, wherein a reflective face of the reflective plate includes a reflecting section and a shadow section where the shadow of the frame is projected, and a boundary between the reflecting section and the shadow section is positioned outward of the inner wall surface of the frame.

9. The method of claim 1, wherein the inner wall surface of the frame includes first and second sides, the first side being closer to the imager than the second side, and the second side being equal to the target portion of the frame.

10. The method of claim 1, wherein said determining, based on the image captured by the imager of the frame held by the chuck at the imaged position of the frame, the position of the target portion of the frame on the image is performed based on an edge detection processing.

11. The method of claim 1, wherein displacement of the chuck in accordance with the correction value causes displacement of the frame in a horizontal direction perpendicular to a vertical direction when the frame is released from the chuck.

12. The method of claim 1, wherein displacement of the chuck in accordance with the correction value causes rotation of the frame around a vertical direction when the frame is released from the chuck.

13. The method of claim 1, further comprising:
   releasing the frame at the release position from the chuck onto the shelf plate; and
   stacking the shelf plate onto the frame released from the chuck.

14. The method of claim 1, wherein the frame includes alumina ($Al_2O_3$) or mullite ($3Al_2O_3.2SiO_2$).

15. The method of claim 1, wherein the frame is shaped like a polygon.

16. The method of claim 1, wherein the shelf plate is provided with at least one protrusion so as to restrict the position of the frame on the shelf plate.

17. The method of claim 1, wherein a ceramic body is placed on the shelf plate, and the ceramic body includes at least silicon carbide (SiC).

18. The method of claim 1, wherein a ceramic body is placed on the shelf plate, and the ceramic body has a lattice-like cell-wall that defines a plurality of cells.

19. A method of producing one or more ceramic fired bodies comprising:
   stacking shelf plates and frames alternately to configure a housing shelf;
   placing one or more ceramic bodies onto one or more of the shelf plates;
   passing the housing shelf through a firing kiln; and
   taking out the one or more ceramic fired bodies from the housing shelf which has passed through the firing kiln,
   said stacking the shelf plates and the frames alternately to configure the housing shelf including:
   holding the frame by a chuck;
   determining, based on an image captured by an image of the frame held by the chuck at an imaged position of the frame, a position of a target portion of the frame on the image; and
   determining, based on the position of the target portion of the frame on the image, at least one correction value for causing a change in a release position for the frame when the frame is released from the chuck onto the shelf plate, wherein
   the target portion of the frame is an inner wall surface of the frame,
   an illumination unit is arranged between the image and the imaged position of the frame, and
   a shadow of the frame formed by an illumination light emitted from the illumination unit is positioned outward of the inner wall surface of the frame so as not to be captured by the imager.

20. A transferring system for transferring a frame included in a housing shelf that is configured from at least shelf plates and frames, the system comprising:
   a chuck that holds the frame;
   an imager that captures an image of the frame held by the chuck at an imaged position of the frame; and
   a correction value determining unit, said correction value determining unit determining, based on the image captured by the imager, a position of a target portion of the frame on the image, and said correction value determining unit determining, based on the position of the target portion of the frame on the image, at least one correction value for causing a change in a release position for the frame when the frame is released onto the shelf plate, wherein the target portion of the frame is an inner wall surface of the frame, an illumination unit is arranged between the imager and the imaged position of the frame, and a shadow of the frame formed by an illumination light emitted from the illumination unit is positioned outward of the inner wall surface of the frame so as not to be captured by the imager.

\* \* \* \* \*